UNITED STATES PATENT OFFICE.

FRANCIS JOSEPH RHODES, OF MALTON, ENGLAND.

DENTIFRICE.

1,169,998.  Specification of Letters Patent.  Patented Feb. 1, 1916.

No Drawing.  Application filed November 17, 1915. Serial No. 62,040.

*To all whom it may concern:*

Be it known that I, FRANCIS JOSEPH RHODES, a subject of the King of Great Britain and Ireland, residing at St. Michael's House, Malton, Yorkshire, England, dental surgeon, have invented certain new and useful Improvements in Dentifrices, of which the following is a specification.

This invention relates to improvements in dentifrices.

Potassium-sulfo-cyanid is present in all normal mouths in a small percentage, it being one of the duties of the salivary glands to elaborate this substance from the blood and discharge it into the mouth as a constituent of normal saliva. Where this compound KCNS is found in full percentage in the mouth there is a healthy condition of the soft tissues and either entire or almost entire freedom from dental diseases, especially dental caries. Conversely, where it is in a diminished quantity or altogether absent the mouth is unhealthy and dental disease, especially dental caries is rife. Savage races with good teeth exhibit a marked full percentage of potassium sulfocyanid in their saliva, bathing the teeth always, and so do those Europeans who are distinguished by healthy mouths and teeth free or almost free from decay. Savage races such as the higher Zulu family, Mandingoes, the higher undemoralized Negroes, and Maoris have every variety and as great a quantity of bacteria present in their mouths as ordinary Europeans have, and save that they secrete and swallow in each 24 hours 4 to 5 times as much saliva as the ordinary European, the only difference in the contents of their mouths as compared with the average European is a full quantity in their case of potassium sulfocyanid.

The local condition associated with mouth health and freedom from dental disease then appeared to me to be the presence in the mouth in sufficient quantity of sulfocyanid and I conducted a systematic course of experiments to ascertain whether it would be possible to obtain similar results with dentifrices comprising sulfocyanid as a constituent. As the result of these experiments I have found that dentifrices containing potassium or other alkaline sulfocyanids as a constituent have consistently reduced the amount of caries prevalent in mouths in a remarkable degree, and that this artificial bringing of the gums, mucous membrane with contained structures and teeth, into contact regularly with potassium or other alkaline sulfocyanid in the form of dentifrices produces a good effect on the mouth and teeth second only to that produced naturally where the saliva contains a proper quantity of the naturally secreted compound.

The present invention is characterized by the employment of potassium or other alkaline sulfocyanids either alone or in conjunction with media or ingredients of a substantially neutral character, as shown by the usual litmus test, to form tooth powders or pastes or liquid dentifrices, it being essential for the purposes of the invention, that the dentifrice shall not possess any pronounced alkaline or acid character.

In further reference potassium-sulfo-cyanid is intended to refer to either or all of the above alkaline sulfo-cyanids.

While I do not confine myself to particular quantities or to particular ingredients (save so far as the chemical compounds above mentioned are concerned) I give the following as examples of dentifrices manufactured in accordance with my invention:

1. *Example of powder dentifrice.*—Potassium sulfo-cyanid, 1 part; precipitated chalk, 14 parts; essential oil flavorings, of each a sufficient quantity.

2. *Example of paste dentifrices.*—Powder dentifrice as above and glycerin of tragacanth, a sufficient quantity. Mix to form a paste.

3. *Example of liquid dentifrice.*—Potassium sulfo-cyanid, 1 part; flavorings, a sufficient quantity; spirits of wine, 7 parts. Dissolve to form a liquid dentifrice.

A convenient method of producing the potassium sulfo-cyanid is to take:—cyanid of potassium, 3 parts; water, 6 parts; sulfur, 1 part; digest them together for some time, add 3 parts more of water, filter, evaporate and crystallize.

In carrying out the invention for the manufacture of powder dentifrices the crystals produced as above described, or otherwise, are dissolved in a convenient quantity of distilled water and the resulting solution is poured upon a quantity of the precipitated chalk basis of the dentifrice, and incorporated therein by mixing thoroughly and evenly. This mixture containing the potassium sulfo-cyanid is then itself placed among and into the balance of ingredients comprising the tooth powder and by successive and repeated mixings and also passages through sieves, is evenly diffused among the whole. I do not confine myself to this method of manufacture however.

The tooth paste may be made as above in so far as its powder basis is concerned and this powder be then mixed with glycerin of tragacanth to form a paste, but I do not confine myself to this method of manufacture.

For liquid dentifrices the potassium sulfo-cyanid will dissolve readily in the alcoholic basis of the dentifrice above specified, but I do not confine myself to this method of manufacture.

What I claim and desire to secure by Letters Patent is:—

1. A dentifrice comprising a vehicle of appropriate dental composition and of neutral reaction combined with a sulfo-cyanid of an alkali metal in such proportions as to supply on use any deficiency in the amount of the sulfo-cyanid which should be present normally in the salivary fluids.

2. A dentifrice comprising a vehicle of appropriate dental composition and of neutral reaction combined with potassium sulfo-cyanid in such proportions as to supply on use any deficiency in the amount of the sulfo-cyanid which should be present normally in the salivary fluids.

In testimony whereof I have signed my name to this specification in the presence of two subscribing witnesses.

FRANCIS JOSEPH RHODES.

Witnesses:
 ARTHUR V. HUDSON,
 HENRY EASBY FROST.